UNITED STATES PATENT OFFICE.

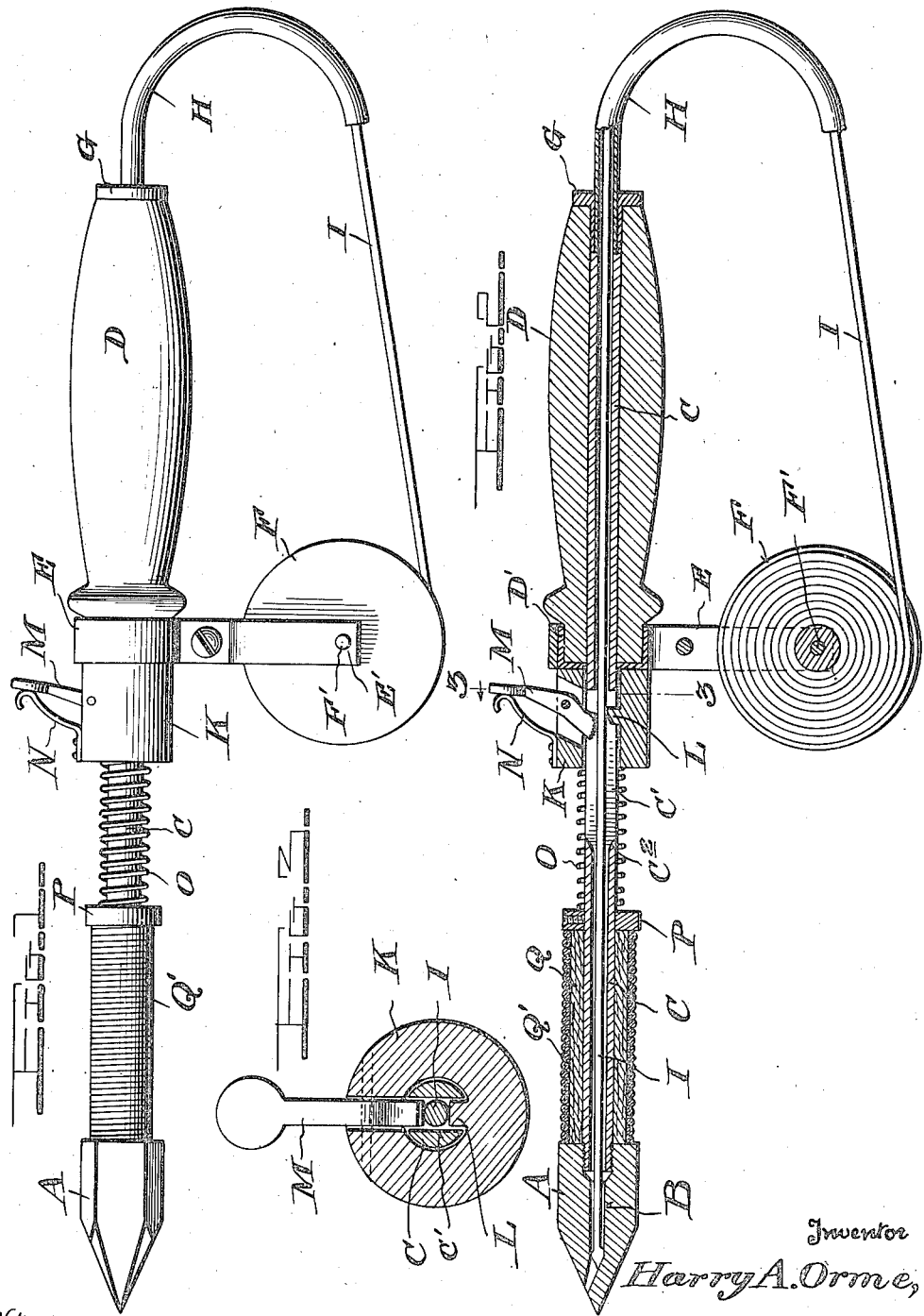

HARRY A. ORME, OF WASHINGTON, DISTRICT OF COLUMBIA.

SELF-FEEDING SOLDERING-IRON.

1,268,877.  Specification of Letters Patent.  Patented June 11, 1918.

Application filed March 27, 1915. Serial No. 17,403.

*To all whom it may concern:*

Be it known that I, HARRY A. ORME, a citizen of the United States, residing at Washington, District of Columbia, have invented a new and useful Self-Feeding Soldering-Iron, of which the following is a specification.

This invention relates generally to hand soldering irons, and more particularly to certain improvements upon a device of this kind shown and described in my application No. 6517 of 1915, now Patent Number 1,152,043.

The present device has for its object to provide for the quick and easy feeding of the solder to the iron by rendering the path of travel of said solder perfectly smooth and even from end to end and also to provide a more positive solder engaging means.

Another object of this invention is to provide a quick detachable reel and also a protecting means for the feed tube adjacent the iron, so that said tube will not become heated sufficiently to melt the solder.

Another object of the invention is to provide for the automatic release and return of the solder feeding mechanism so that only a forward pushing movement of the operator's thumb is necessary to accomplish the feeding operation.

With these objects in view my invention consists in the novel features of construction, combination or arrangement, all of which will be fully described hereinafter and pointed out in the claim.

In the drawings forming a part of this specification,

Figure 1 is a slide elevation of a soldering iron embodying my improvements.

Fig. 2 is a longitudinal sectional view of the same.

Fig. 3 is a transverse section on the line 3—3 of Fig. 2.

In carrying out my present invention I employ the iron A, having a passage B extending therethrough and fitting into the rear end of this passage is the tube C which constitutes the feeding tube for the solder and also the shank for the iron. A handle D is arranged upon the rear end of the tube C and in its forward end this handle has a ferrule D', around which is secured the reel carrying clip E, the reel F being inserted between the parallel apertured ends of the clip, the ends of the axle F' springing into and engaging the apertures E' in the ends of the spring clip. By means of this construction a reel carrying a definite quantity of solder wire is detachably connected with the reel clip or bracket.

A thimble G is fitted into the rear end of the handle D and is constructed with curved extension H through which the soldering wire or strand passes from the reel to the iron as most clearly shown and this extension H is curved in such a manner that the wire or strand will not bind as it is carried around from the reel and fed forwardly through the handle from the rear end thereof.

Upon the tube C in advance of the forward end of handle is a collar K carrying a fixed dog L and a pivoted dog M which is normally held out of engagement by a spring N attached to the collar and bearing against the upper end of the pivoted dog. A coiled spring O surrounds the tube and bears against the collar K and holds the same normally against the forward end of the handle, the opposite end of the spring bearing against a fixed ring P secured to the tube as shown and between this ring P and the iron A, I preferably surround the tube with asbestos or other non-conducting material held in place by means of the wire wrapping Q'. This asbestos covering prevents the tube becoming sufficiently heated to melt the solder before it reaches the iron.

In operation the reel carrying the solder wire is snapped between the members of the clip and the free end of the solder is inserted into the curved guide H and forced by hand through the thimble into the tube and passed along forwardly until it passes between the fixed and movable dogs of the sliding collar. Then by pushing on the movable dog it is caused to bind against the solder and simultaneously move the collar forwardly a distance permitted by the spring O which is compressed against the ring P, the tube C being slotted longitudinally as shown at C' in order to receive the dogs and permit the movement of the collar and it will be noted that the edges of the tube opening at the forward side of the slot C' are curved as shown at C², in order to make a funnel or bell shaped opening for the solder wire and prevent the same impinging against the end of the tube at that point.

It will be noted that it is only necessary to press upon the pivoted dog to cause the binding engagement against the solder and at the same time the collar is moved forwardly and feeds the solder. When the thumb is released the spring N releases the dog M and the spring O returns the collar K to its normal position where a fresh grip can be had upon the wire for feeding the same forwardly to the iron which it will be understood is heated by a torch or any other suitable method and when the forward end of the solder reaches the hot iron it immediately liquefies and flows out of the orifice at the forward end and by drawing the iron along the metal which has been wiped with acid the stream of solder will be caused to follow the same and the soldering operation can be quickly and easily accomplished, and when a fresh supply of solder is needed it is only necessary to push upon the dog and operate the collar to feed the wire forwardly.

What I claim is:

In a device of the kind described, the combination with a soldering iron, a tube slotted on opposite sides, a spring coiled about the tube, a collar slidable on the tube and engaged by said spring, a fixed dog carried by the collar and entering one slot of the tube, a pivoted dog carried by the collar and entering the opposite slot, the material fed passing between said dogs, and a spring carried by the collar and bearing on the pivoted dog.

HARRY A. ORME.